(12) United States Patent
Kawai

(10) Patent No.: US 7,687,419 B2
(45) Date of Patent: Mar. 30, 2010

(54) GLASS COMPOSITION, GLASS SUSBSTRATE EMPLOYING IT FOR AN INFORMATION RECORDING MEDIUM, AND INFORMATION RECORDING MEDIUM EMPLOYING IT

(75) Inventor: Hideki Kawai, Kobe (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 739 days.

(21) Appl. No.: 10/957,899

(22) Filed: Oct. 4, 2004

(65) Prior Publication Data

US 2005/0215414 A1   Sep. 29, 2005

(30) Foreign Application Priority Data

Mar. 25, 2004   (JP)   ............................. 2004-088252

(51) Int. Cl.
*C03C 3/095* (2006.01)
*C03C 3/093* (2006.01)
*C03C 3/085* (2006.01)

(52) U.S. Cl. ............................. 501/64; 501/66; 501/67; 501/69; 428/846.9

(58) Field of Classification Search ................... 501/64, 501/66, 67, 69; 428/846.9
See application file for complete search history.

(56) References Cited

U.S. PATENT DOCUMENTS

| | | | | |
|---|---|---|---|---|
| 4,542,105 | A | * | 9/1985 | Furukawa et al. ............. 501/22 |
| 4,746,578 | A | * | 5/1988 | Kondo et al. ................. 428/432 |
| 5,382,552 | A | * | 1/1995 | Saad et al. .................... 501/25 |
| 5,780,371 | A | * | 7/1998 | Rifqi et al. .................... 501/67 |
| 5,854,153 | A | * | 12/1998 | Kohli ........................... 501/70 |
| 5,874,376 | A | * | 2/1999 | Taguchi et al. ................ 501/63 |
| 6,087,282 | A | * | 7/2000 | Panzera et al. ................ 501/21 |
| 6,294,490 | B1 | | 9/2001 | Zou et al. ...................... 501/9 |
| 6,297,182 | B1 | * | 10/2001 | Maeda et al. .................. 501/66 |
| 6,303,528 | B1 | * | 10/2001 | Speit et al. .................... 501/69 |
| 6,376,402 | B1 | * | 4/2002 | Pannhorst et al. ............. 501/66 |
| 6,413,892 | B1 | * | 7/2002 | Koyama et al. ............... 501/64 |
| 6,627,565 | B1 | | 9/2003 | Zou et al. ...................... 501/4 |
| 6,949,485 | B2 | * | 9/2005 | Nakashima et al. ........... 501/69 |
| 2002/0010066 | A1 | * | 1/2002 | Nakashima et al. ........... 501/69 |

FOREIGN PATENT DOCUMENTS

| | | | |
|---|---|---|---|
| JP | 7-172863 | A | 7/1995 |
| JP | 09-012333 | A | 1/1997 |
| JP | 11-310341 | A | 11/1999 |
| JP | 11-310342 | A | 11/1999 |
| JP | 11-310430 | A | 11/1999 |
| JP | 2000-351649 | A | 12/2000 |
| JP | 2001-58843 | A | 3/2001 |
| JP | 2001-180969 | A | 7/2001 |
| JP | 2001-294441 | A | 10/2001 |
| JP | 2001-348246 | A | 12/2001 |
| JP | 2004-10430 | A | 1/2004 |
| WO | WO 98/55993 | A1 | 12/1998 |

OTHER PUBLICATIONS

Japanese "Notification of Reasons for Rejection", dated Jan. 30, 2007, for counterpart Japanese Patent Application No. 2004-088252; Together with an English-language translation thereof.
Japanese "Notification of Reasons for Rejection", dated Jul. 17, 2007, for counterpart Japanese Patent Application No. 2004-088252; Together with an English-language translation thereof.
"Submission of Publications etc. (by a Third Party)", dated Nov. 29, 2006, for counterpart Japanese Patent Application No. 2004-088252; Together with an English-language translation thereof.

* cited by examiner

*Primary Examiner*—Karl E Group
*Assistant Examiner*—Elizabeth A Bolden
(74) *Attorney, Agent, or Firm*—Sidley Austin LLP

(57) ABSTRACT

A glass substrate used as a substrate of an information recording medium such as a magnetic disk, magneto-optical disk, DVD, or MD, and a glass composition used to make such a glass substrate, contains the following glass ingredients: 40 to 70% by weight of $SiO_2$; 1 to 20% by weight of $Al_2O_3$; 0 to 10% by weight, zero inclusive, of $B_2O_3$; $SiO_2+Al_2O_3+B_2O_3$ accounting for 60 to 90% by weight; a total of 3.0 to 15% by weight of $R_2O$ compounds, where R=Li, Na, and K; a total of 2.0 to 15% by weight of R'O compounds, where R=Mg, and Zn; and a total of 1.0 to 20% by weight of MOx ($TiO_2+ZrO_2+Ln_xO_y$), where $Ln_xO_y$ represents at least one compound selected from the group consisting of lanthanoid metal oxides, $Y_2O_3$, $Nb_2O_5$, and $Ta_2O_5$. Here, the following condition is fulfilled:

$$0.070 < (\text{total content of R'O compounds})/(SiO_2 + Al_2O_3 + B_2O_3) < 0.200.$$

14 Claims, 1 Drawing Sheet

$$C = [(L_1 + L_2)/2]/2$$

GLASS COMPOSITION, GLASS SUSBSTRATE EMPLOYING IT FOR AN INFORMATION RECORDING MEDIUM, AND INFORMATION RECORDING MEDIUM EMPLOYING IT

This application is based on Japanese Patent Application No. 2004-088252 filed on Mar. 25, 2004, the contents of which are hereby incorporated by reference.

BACKGROUND OF THE INVENTION

1. Field of the Invention

The present invention relates to a glass substrate for an information recording medium (hereinafter also referred to simply as "a glass substrate") and to a glass composition used to make such a glass substrate. More particularly, the present invention relates to a glass substrate for use as a substrate of an information recording medium such as a magnetic disk, magneto-optical disk, DVD, or MD and to a glass composition used to make such a glass substrate.

2. Description of Related Art

Conventionally, magnetic disks for use in stationary devices such as desk-top computers and servers typically have substrates made of aluminum alloy, and those for use in portable devices such as notebook computers and mobile computers typically have substrates made of glass. However, aluminum alloy is prone to deformation, and is not hard enough to offer satisfactory surface smoothness on the surfaces of a substrate after polishing. Moreover, when a head makes mechanical contact with a magnetic disk, the magnetic film is liable to exfoliate from the substrate. For these reasons, substrates made of glass, which are less prone to deformation and which offer satisfactory surface smoothness combined with high mechanical strength, are expected to be increasingly used in the future not only in portable devices but also in stationary devices and other home-use information devices.

Commonly known types of glass substrate include: those made of chemically strengthened glass, in which the alkali elements present near the surface of the substrate are replaced with other alkali elements in order to obtain increased mechanical strength; those made of crystallized glass, which have been subjected to crystallization treatment; and those made of soda lime glass.

These types of glass material, however, have the following disadvantages. Chemically strengthened glass requires a complicated ion-exchange process, and does not permit reprocessing once ion exchange is complete. This makes it difficult to achieve high yields. Moreover, to permit ion exchange to take place in the glass substrate, alkali metal ions need to be left easily movable therein. Thus, the alkali metal ions that are present near the surface of the substrate may move to the surface and exude therefrom during the heating process when the magnetic film is formed, or erode the magnetic film, or degrade the bond strength of the magnetic film.

Crystallized glass does not offer satisfactory surface smoothness, and therefore it is difficult to achieve high-density recording therewith. To solve this problem, there have been proposed, for example, crystallized glasses that contain either a solid solution of quartz or enstatite as the main crystal (U.S. Pat. Nos. 6,294,490 and 6,627,565). However, these crystallized glasses have a high surface hardness, and are thus difficult to polish, making it difficult to control the surface shape by tape polishing or the like.

Soda lime glass is not mechanically strong nor chemically durable enough to be suitable as a material for substrates for information recording. In addition, like the chemically strengthened glass described above, soda lime glass contains alkali metal ions. Thus, the alkali metal ions that are present near the surface of the substrate may erode the magnetic film, or degrade the bond strength of the magnetic film. To solve this problem, there have been proposed, for example, glasses that contain no alkali metal oxides (Japanese Patent Application Laid-Open No. H9-12333). However, these glasses need to contain large amounts of alkaline-earth metals or boron oxides to obtain satisfactory fusibility. This makes them prone to devitrification, and reduces their fracture toughness, greatly lowering their processing yields.

SUMMARY OF THE INVENTION

In view of the conventionally encountered problems described above, it is an object of the present invention to provide, for an information recording medium, a glass substrate that offers an excellent specific elastic modulus without being subjected to strengthening treatment and that offers low alkali elution, high heat resistance, high fracture toughness, and a predetermined surface hardness, and also to provide a glass composition used to make such a glass substrate.

It is another object of the present invention to provide an information recording medium that excels in mechanical strength and durability and that permits high-density recording.

To achieve the above objects, according to the present invention, a glass substrate and a glass composition used to make it contain the following glass ingredients: 40 to 70% by weight of $SiO_2$; 1 to 20% by weight of $Al_2O_3$; 0 to 10% by weight, zero inclusive, of $B_2O_3$; $SiO_2+Al_2O_3+B_2O_3$ accounting for 60 to 90% by weight; a total of 3.0 to 15% by weight of $R_2O$ compounds, where R=Li, Na, and K; a total of 2.0 to 15% by weight of R'O compounds, where R=Mg, and Zn; and a total of 1.0 to 20% by weight of MOx ($TiO_2+ZrO_2+Ln_xO_y$), where $Ln_xO_y$ represents at least one compound selected from the group consisting of lanthanoid metal oxides, $Y_2O_3$, $Nb_2O_5$, and $Ta_2O_5$. Here, the following condition is fulfilled:

$$0.070 < \text{(total content of R'O compounds)}/(SiO_2+Al_2O_3+B_2O_3) < 0.200.$$

It is to be noted that, in the following descriptions, "%" denotes "percent by weight" unless otherwise stated.

A glass substrate of this composition offers an excellent specific elastic modulus without being subjected to strengthening treatment; it also offers a surface hardness sufficient to prevent scratches on the surface of the substrate and to permit easy surface processing such as polishing; and it also offers low alkali elution. Moreover, it offers high fracture toughness, preventing breakage of the substrate, for example, during the fabrication of a substrate for information recording. Furthermore, it offers excellent heat resistance, permitting the recording film to be subjected to heat treatment at a high temperature, thereby permitting high-density recording.

Using a glass substrate of the above composition in an information recording medium permits easy surface treatment, prevents breakage during the fabrication process, and helps achieve excellent durability and high recording density.

In the present specification, the specific elastic modulus (E/ρ) equals the Young's modulus E divided by the specific gravity ρ. The Young's modulus E was measured by the method for testing dynamic modulus of elasticity included in the methods for testing elasticity of fine ceramics defined in JIS (Japanese Industrial Standards) R 1602. The Vickers hardness Hv was measured using a Vickers hardness tester under the following conditions: with a load of 100 g, and with loading duration of 15 seconds. The alkali elution A and $SiO_2$ elution S were determined by first polishing the surface of each glass sample with cerium oxide so as to obtain a smooth surface having an Ra value of 2 nm or lower, then cleaning its surface, then immersing it in 50 ml of reverse osmosis membrane water at 80° C. for 24 hours, and then analyzing the elution liquid with an ICP emission spectrochemical analyzer. Thus, the alkali elution here is the total elution of Li, Na, and K. As glass samples, those having substantially the same surface area as a 2.5-inch disk were used.

The glass transition temperature Tg was measured by heating each glass sample, prepared in the form of powder, at a temperature increase rate of 10° C./min within the temperature range of from room temperature to 900° C. using a differential thermal calorimeter. The fracture toughness Kc was determined using a Vickers hardness tester and according to the formula noted below on the basis of the pressure mark produced with a Vickers indenter under the following conditions: with a load of 500 g, and with loading duration of 15 seconds (see FIG. 2).

$$Kc = 0.018(E/Hv)^{1/2}(P/C^{3/2}) = 0.026E^{1/2}P^{1/2}a/C^{3/2}$$

where Kc represents the fracture toughness ($Pa \cdot m^{1/2}$), E represents the elastic modulus (Pa), Hv represents the Vickers hardness (Pa), P represents the pressing load (N), C represents half the average of the lengths of cracks (m), and "a" represents half the average of the lengths of the diagonals of the pressure mark (m).

DETAILED DESCRIPTION OF PREFERRED EMBODIMENTS

Figure 1:
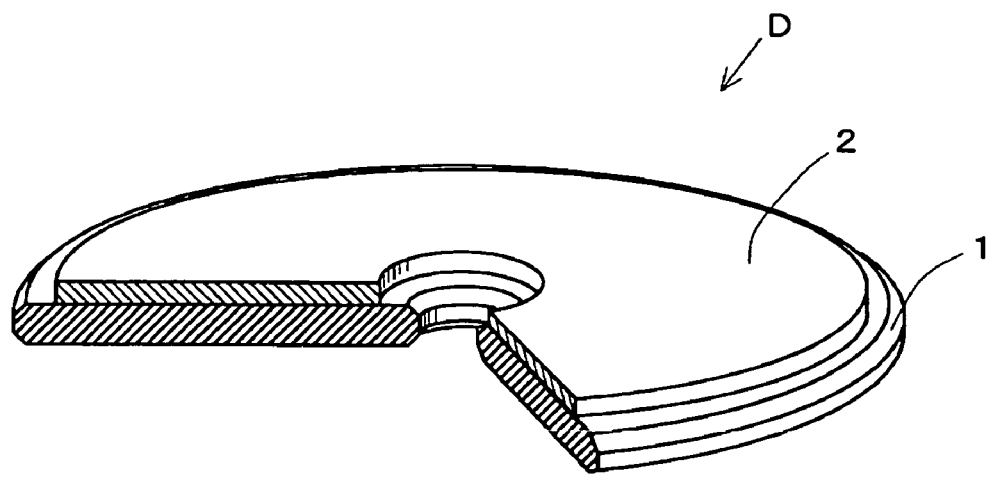
FIG. 1 is a perspective view showing an example of an information recording medium employing a glass substrate according to the invention.
Figure 2:
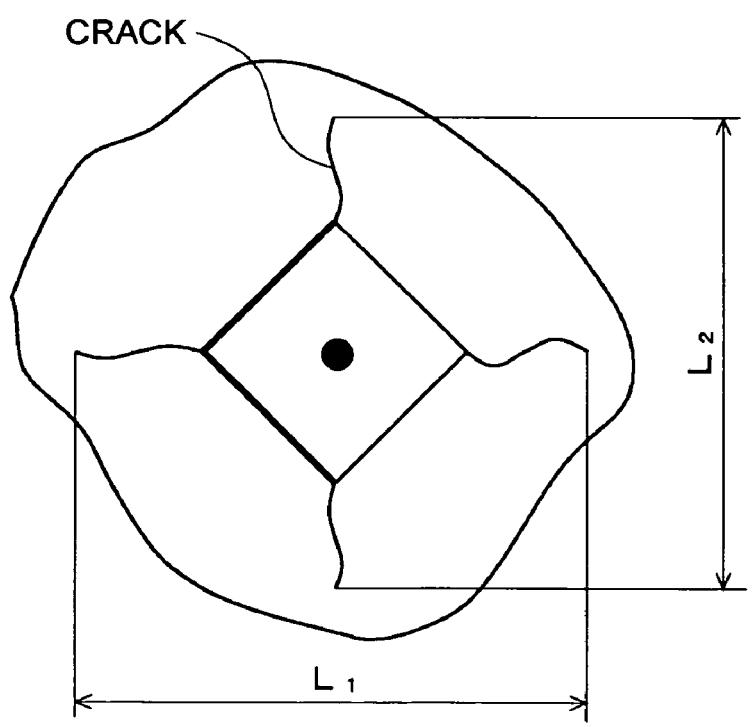
FIG. 2 is a diagram schematically showing a pressure mark and cracks produced when a pressure is applied to the surface of a glass substrate with a Vickers indenter.

The inventor of the present invention made an intensive study in search of a way to achieve the above objects, and found out that the aim can be attained by limiting within predetermined ranges the compositional proportions of individual glass ingredients, in particular the total content and ingredient proportions of the skeletal ingredients, namely $SiO_2$—$Al_2O_3$—$B_2O_3$, and the proportions and total contents of R'O and MOx. This finding has led the inventor to conceive the present invention.

Hereinafter, the grounds for setting limits on the ingredients of a glass composition according to the present invention will be explained. First of all, $SiO_2$ is an ingredient that forms the matrix of glass. With a $SiO_2$ content less than 40%, the glass has an unstable structure. This not only degrades the chemical durability of the glass, but also degrades the melt viscosity properties thereof, making the glass difficult to mold. On the other hand, with a $SiO_2$ content higher than 70%, the glass shows low fusibility. This lowers productivity and makes it impossible to obtain sufficient rigidity. Hence, a preferred range of the $SiO_2$ content is from 40 to 70%. A further preferred range is from 45 to 65%.

$Al_2O_3$ gets into the matrix of glass, and serves to stabilize the structure of the glass and enhance the chemical durability thereof. With an $Al_2O_3$ content lower than 1%, the glass structure is not stabilized sufficiently. On the other hand, with an $Al_2O_3$ content higher than 20%, the glass shows low fusibility, lowering productivity. Hence, a preferred range of the $Al_2O_3$ content is from 1 to 20%. A further preferred range is from 5 to 18%. A particularly preferred range is from 10 to 18%.

$B_2O_3$ improves the fusibility of glass and thereby enhances productivity. In addition, it gets into the matrix of the glass, and serves to stabilize the structure of the glass and enhance the chemical durability thereof. With a $B_2O_3$ content higher than 10%, the glass shows poor melt viscosity properties, making it difficult to mold, and in addition the molten glass exhibits high volatility, greatly lowering productivity and stability. Moreover, the glass has a brittle structure, resulting in degraded chemical durability and fracture toughness. Hence, a preferred range of the $B_2O_3$ content is 10% or lower (zero inclusive). A further preferred upper limit is 5%, and a preferred lower limit is 0.5%.

If the total content of these three glass ingredients, which are the skeletal ingredients of glass, is less than 60%, the glass has a brittle structure. On the other hand, if their total content is higher than 90%, the glass shows low fusibility, lowering productivity. Hence, a preferred total content of those glass ingredients is from 60 to 90%. A further preferred range is from 65 to 85%. A particularly preferred range is from 70 to 80%.

Alkali metal oxides $R_2O$ (R=Li, Na, and K) stabilize the structure of glass and improve the fusibility thereof, resulting in enhanced melt productivity. With a total alkali metal oxide content lower than 3.0%, the just mentioned benefits cannot satisfactorily be obtained. On the other hand, with a total alkali metal oxide content higher than 15%, excess amounts of alkali metal oxides are dispersed throughout the skeleton of the glass, increasing alkali elution. This results in a brittle glass bond structure, resulting in very low chemical durability and very low heat resistance and fracture toughness. Hence, a preferred range of the total alkali metal oxide content is from 3.0 to 15%. A further preferred range is from 5.0 to 12.0%. A particularly preferred range is from 7.0 to 10.0%. Moreover, to obtain a so-called mixed alkali effect, which helps reduce alkali elution, it is preferable that the lower limit of the content of each alkali metal oxide be 0.1%.

Divalent metal oxides R'O (R'=Mg and Zn) increase the rigidity of glass, improve the fusibility thereof, and stabilize the structure thereof. With a total R'O content lower than 2.0%, the just mentioned benefits cannot satisfactorily be obtained. On the other hand, with a total R'O content higher than 15%, the glass has a brittle structure, resulting in greatly degraded chemical durability and fracture strength and lower melt productivity. Hence, a preferred range of the R'O content is from 2.0 to 15%. A further preferred range of the total R'O content is from 3 to 13%. Preferred contents of the individual R'O ingredients are given below.

$TiO_2$, $ZrO_2$, and $Ln_xO_y$ strengthen the structure of glass, and enhance the rigidity and heat resistance thereof. With a total MOx content, i.e., a total content of the just mentioned ingredients, lower than 1.0%, the just mentioned benefits cannot be satisfactorily obtained. On the other hand, with a total MOx content higher than 20%, glass is unstable, with very low fracture toughness. Moreover, the glass is more prone to devitrification, greatly lowing the productivity thereof. Hence, a preferred range of the total MOx content is from 1.0 to 20%. A further preferred range of the total MOx content is from 2 to 15%. Preferred contents of these glass ingredients are given below.

$TiO_2$ strengthens the structure of glass, enhances the rigidity thereof, and improves the fusibility thereof. With a $TiO_2$ content higher than 10%, glass has an unstable structure, possibly resulting in lower melt productivity and lower chemical durability. Hence a preferred range of the $TiO_2$ content is from 0 to 10%. A further preferred range is from 0.5 to 7.0%. A particularly preferred range is from 1.0 to 5.0%.

$ZrO_2$ strengthens the structure of glass, enhances the rigidity and heat resistance thereof, and enhances the chemical durability thereof. A $ZrO_2$ content higher than 10% results in low fusibility, and thus in unsatisfactory productivity. Hence, a preferred range of the $ZrO_2$ content is from 0 to 10%. A further preferred range is from 0 to 8%. A particularly preferred range is from 0.5 to 5.0%.

$Ln_xO_y$ strengthens the structure of glass, and enhances the rigidity, heat resistance, and fracture toughness thereof. With a $Ln_xO_y$ content higher than 8%, glass has an unstable structure, resulting in low melt productivity and an unduly great specific gravity, making the glass unsuitable for a hard disk drive component. Hence, a preferred upper limit of the $Ln_xO_y$ content is 8%. A further preferred upper limit is 6%. Here, $Ln_xO_y$ represents at least one compound selected from the group consisting of lanthanoid metal oxides, $Y_2O_3$, $Nb_2O_5$, and $Ta_2O_5$. Lanthanoid metal oxides include different types of compounds of composition $Ln_2O_3$, LnO, and the like, and examples of Ln include La, Ce, Er, Pr, Nd, Pm, Sm Eu, Gd, Tb, Dy, Ho, Tm, Yb, and Lu.

In a glass composition according to the invention, it is necessary that the value of (total content of R'O compounds)/$(SiO_2+Al_2O_3+B_2O_3)$ be greater than 0.070 but smaller than 0.200. This ratio is the proportion of such ingredients of glass as give it a firm glass structure, enhanced rigidity and heat resistance, and improved fusibility to the skeletal ingredients thereof. With the ratio equal to 0.070 or less, the total content of R'O compounds relative to that of the skeletal ingredients is so low that the just mentioned benefits cannot be satisfactorily obtained. On the other hand, with the ratio equal to 0.200 or more, the total content of R'O compounds is too high relative to that of the skeletal ingredients, resulting in an unstable glass structure, low chemical durability and fracture toughness, and very low melt moldability. A preferred range of the ratio is from 0.080 to 0.180.

In a glass composition according to the invention, it is necessary that the value of $Al_2O_3/(SiO_2+Al_2O_3+B_2O_3)$ be greater than 0.10 but smaller than 0.35. The value of $Al_2O_3/(SiO_2+Al_2O_3+B_2O_3)$ is an indicator that represents the compositional proportion of a given one to all of the skeletal ingredients in the glass skeleton. With the proportion equal to 0.10 or less, the $Al_2O_3$ content in the glass skeleton is insufficient. This makes the glass skeleton weak, possibly resulting in unsatisfactory rigidity and heat resistance. On the other hand, with the proportion equal to 0.35 or higher, the $Al_2O_3$ content in the glass skeleton is excessive. This makes the glass skeleton unstable, possibly resulting in very low melt productivity and unsatisfactory strength properties, fracture toughness, and chemical durability. A further preferred range is from 0.15 to 0.25.

In a glass composition according to the invention, when the $B_2O_3$ content is non-zero, it is preferable that the value of $Al_2O_3/B_2O_3$ be greater than 2.0. With the value of $Al_2O_3/B_2O_3$ equal to 2.0 or less, the $B_2O_3$ content in the glass skeleton is excessive. This makes the glass structure weak, possibly resulting in unsatisfactory fracture toughness.

It is preferable that the value of (total content of R'O compounds)/(MOx content) be greater than 0.50 but smaller than 5.00. As already discussed, R'O and MOx are both ingredients that make the glass structure firm and that enhance rigidity and heat resistance. If this ratio falls outside the just mentioned range, the glass structure is weak, resulting in low melt productivity, and possibly resulting in very low chemical durability and fracture toughness. A further preferred range of the ratio is from 0.70 to 3.50.

A glass composition according to the invention may further contain, as necessary, any other compounds such as CaO, SrO, BaO, and $Sb_2O_3$, so long as the effects achieved by the present invention are not spoilt. CaO increases the linear thermal expansion coefficient and rigidity of glass, and improves the fusibility thereof. A preferred range of the CaO content is from 0 to 10%. SrO increases the linear thermal expansion coefficient of glass, and improves the fusibility thereof. A preferred range of the SrO content is from 0 to 8%. BaO exerts the same effects as SrO. A preferred range of the BaO content is from 0 to 8%. $Sb_2O_3$ acts as a clarifier. A preferred range of the $Sb_2O_3$ content is 2% or lower.

Next, a glass substrate according to the invention will be described. The main feature of a glass substrate according to the invention is that it is formed of a glass composition as described above. A glass substrate according to the invention may be produced by any conventionally known fabrication process, for example in the following manner. Raw materials of glass ingredients, i.e., oxides, carbonates, nitrates, hydroxides, and the like corresponding to the individual ingredients, are, in the desired proportions and in the form of powder, fully mixed to obtain a blending of the raw materials. This blending is then put, for example, in a platinum crucible placed inside an electric furnace heated to 1 300 to 1 550° C., where the blending is first melted and clarified and then stirred and homogenized. The molten glass is then poured into a preheated mold, and is cooled slowly so as to be formed into a glass block. Next, the glass block is heated again to close to its glass transition temperature and is then cooled slowly so as to be straightened. The glass block thus obtained is then sliced into a disk, and is cut out using a core drill so as to have concentric outer and inner edges. Alternatively, the molten glass is formed into a disk by press molding. The disk-shaped glass material thus obtained is then formed into a glass substrate by subjecting the two flat surfaces of the glass material to coarse and fine polishing and then to cleaning using at least one of a water liquid, an acidic liquid, or an alkaline liquid.

Here, since a glass substrate according to the invention is used as a substrate of an information recording medium, to minimize the floating distance of the head and the film thickness of the recording medium, it is preferable that the glass substrate have, after the polishing process, a surface roughness Ra of 1 nm or lower and, after the cleaning process, a surface roughness Ra' equal to or lower than 1.5 times the surface roughness Ra. With a glass substrate containing alkali ingredients in high proportions and treated by strengthening, it is possible to obtain a surface roughness Ra of 1 nm or lower by polishing, but, when the surface of the substrate is cleaned with water, an acid, or an alkali in the following cleaning process, owing to its low chemical durability, its surface is violently eroded, resulting in a high surface roughness Ra' after the cleaning process. On the other hand, with a glass substrate that is not treated by strengthening, its composition is uniform between at the surface and in the interior, and therefore, in general, the surface roughness Ra' of the substrate does not change so much during the cleaning process. Accordingly, by optimizing the glass ingredients, it is possible to control the surface roughness Ra' after the cleaning process within 1.5 times the surface roughness Ra after the polishing process.

In a glass substrate according to the invention, it is preferable that its properties fulfill the following conditions. First, it is preferable that the specific elastic modulus $E/\rho$ be 33 or higher. With a glass substrate that is not treated by strengthening, its mechanical strength depends on its rigidity. Thus, with a specific elastic modulus lower than 33, the substrate has insufficient mechanical strength so that, when it receives impact while being mounted in a hard disk drive, it is prone to breakage at where it is fastened to a hard disk drive member. A further preferred specific elastic modulus E/ρ is 34 or higher.

It is preferable that the Vickers hardness Hv be in the range of from 550 to 675. With a Vickers hardness lower than 550, the substrate is prone to breakage resulting from impact and to damage in the fabrication process. On the other hand, a Vickers hardness higher than 675 lowers the rate at which the glass substrate can be polished in the polishing process, makes it difficult to obtain a surface with the desired flatness, and makes it difficult to adjust the surface shape of the substrate by tape texture polishing, or correct surface defects by scrub washing, or perform other treatment after the polishing process. The Vickers hardness of the substrate can be controlled within that range, for example, by adjusting, so long as the desired main properties are not degraded, the proportions of the ingredients in such a way as to increase the ion fill factor. A further preferred lower limit of the Vickers hardness Hv is 570, and a further preferred upper limit thereof is 650.

It is preferable that the alkali elution A be 200 ppb or lower per 2.5-inch disk. With alkali elution A higher than 200 ppb, when the glass substrate is used in an information recording medium, the recording film such as a magnetic film that is formed on the surface of the glass substrate is degraded by elution of the alkali ingredients from the substrate. Further preferred alkali elution A is 150 ppb or lower, and particularly preferred alkali elution A is 100 ppb or lower.

It is preferable that the Si elution S be 500 ppb or lower per 2.5-inch disk. With Si elution S higher than 500 ppb, when the glass substrate is used in an information recording medium, the recording film such as a magnetic film that is formed on the surface of the glass substrate is degraded by elution of the alkali ingredients from the substrate. Further preferred Si elution S is 350 ppb or lower.

It is preferable that the fracture toughness Kc be 0.85 or higher. With a fracture toughness Kc lower than 0.85, when the glass substrate is used in an information recording medium, a crack may develop in the glass substrate when pressure or the like is applied thereto in the process of forming a recording film such as a magnetic film on the surface thereof. Moreover, with a fracture toughness Kc lower than 0.85, the substrate is prone to damage when it is machined, leading to a low machining yield. A further preferred lower limit of the fracture toughness Kc is 0.90.

It is preferable that the glass transition temperature Tg be 550° C. or higher. As a method for achieving high-density recording in a magnetic recording medium, much attention has recently been paid to the technique of raising the temperature at which the medium (the recording film) is subjected to heat treatment with a view to improving the film crystal structure. In particular, in the perpendicular magnetic recording method expected as a new-generation recording method, the temperature at which the recording film is subjected to heat treatment is far higher than that used in the currently common in-plane recording method. To make the glass substrate resistant to heat treatment at such high temperatures, it is preferable that the glass transition temperature Tg be in the above mentioned temperature range. A further preferred lower limit of the glass transition temperature Tg is 570° C.

In a glass substrate according to the invention, it is preferable that the following inequalities be fulfilled. First, it is preferable that the inequality Tg/Hv>0.85 be fulfilled. The value of Tg/Hv is an indicator that represents the balance between heat resistance and surface workability. With this value equal to or greater than 0.85, the surface hardness of the glass substrate is in a preferred range in relation to the heat resistance thereof, permitting easy control of the surface shape. A further preferred lower limit of Tg/Hv is 0.90.

It is preferable that the inequality Tg×Kc>500 be fulfilled. The value of Tg×Kc is an indicator that represents the thermal strength stability of the glass substrate. The greater this value, the higher the thermal strength stability of the glass substrate, and the more resistant it is to thermal impulse, enabling it to withstand the sudden thermal load applied thereto during film formation. A further preferred lower limit of Tg×Kc is 550.

It is preferable that the inequality Tg×Kc/Hv>0.80 be fulfilled. The value of Tg×Kc/Hv is an indicator that represents the balance between the heat resistance and processing stability of the glass substrate. With this value greater than 0.80, the processing stability of the glass substrate is sufficiently high in relation to the heat resistance thereof, meaning that the substrate offers excellent productivity. A further preferred lower limit of Tg×Kc/Hv is 0.90.

A glass substrate according to the invention can be used to produce disks of any diameter, for example 3.5-inch, 2.5-inch, 1.8-inch, and any smaller-diameter disks, with any thickness, for example 2 mm thick, 1 mm thick, 0.63 mm thick, and any slimmer disks.

Next, an information recording medium employing a glass substrate according to the invention will be described. When employed as a substrate of an information recording medium, a glass substrate according to the invention contributes to durability and high recording density. Now, such an information recording medium will be described with reference to the drawing.

FIG. 1 is a perspective view of a magnetic disk. This magnetic disk D is composed of a circular glass substrate 1 and a magnetic film 2 formed directly on a surface thereof. The magnetic film 2 may be formed by any conventionally known method. For example, it is formed by spin-coating the substrate with a thermosetting resin having magnetic particles dispersed therein, or by sputtering, or by electroless plating. Spin-coating provides a film thickness of about 0.3 to 1.2 μm, sputtering provides a film thickness of about 0.04 to 0.08 μm, and electroless plating provides a film thickness of about 0.05 to 0.1 μm. To minimize the film thickness and maximize the density, it is preferable to form the magnetic film 2 by sputtering or electroless plating.

The magnetic film may be formed out of any conventionally known magnetic material, of which a preferred example is a Co-based alloy that contains Co, which exhibits high crystal anisotropy, as its main ingredient so as to have high coercivity and that has Ni and Cr added thereto to adjust remanent magnetic flux density. Specifically, examples of such alloys containing Co as their main ingredient include CoPt, CoCr, CoNi, CoNiCr, CoCrTa, CoPtCr, CoNiPt, CoNiCrPt, CoNiCrTa, CoCrPtTa, CoCrPtB, and CoCrPtSiO. The magnetic film may be divided into a plurality of layers with one or more non-magnetic films (for example, Cr, CrMo, or CrV) laid in between so as to form a multilayer structure (for example, CoPtCr/CrMo/CoPtCr, or CoCrPtTa/CrMo/CoCrPtTa) with a view to reducing noise. Instead of the magnetic materials mentioned above, it is also possible to use a magnetic material of a granular type having magnetic particles of Fe, Co, FeCo, CoNiPt, or the like dispersed in a non-magnetic film of a ferrite-based material, an iron/rare earth-based material, $SiO_2$, BN, or the like. The magnetic film may be for either in-plane recording or perpendicular recording.

To ensure smooth sliding of a magnetic head, the magnetic film may be coated with a thin layer of lubricant on the surface. An example of the lubricant is perfluoro polyether (PFPE), a liquid lubricant, diluted with a CFC-based solvent.

As required, a primer or protective layer may additionally be formed. In a magnetic disk, the material of the primer layer is selected according to the magnetic film. The primer layer is formed out of, for example, one or more selected from non-magnetic metals such as Cr, Mo, Ta, Ti, W, V, B, Al, and Ni. With a magnetic film containing Co as its main ingredient, Cr used singly or a Cr alloy is preferred for better magnetic properties and out of other considerations. The primer layer may be composed of a single layer, or may be composed of a plurality of layers of identical or different types laid over one another to form a multilayer primer layer such as Cr/Cr, Cr/CrMo, Cr/CrV, NiAl/Cr, NiAl/CrMo, or NiAl/CrV.

The protective layer for preventing wear and corrosion of the magnetic film may be a layer of Cr, Cr alloy, carbon, hydrogenated carbon, zirconia, silica, or the like. Such a protective layer can be formed in continuous steps with the primer layer, the magnetic film, and the like using an in-line-type sputtering machine. The protective layer may be composed of a single layer, or may be composed of a plurality of layers of identical or different types laid over one another to form a multilayer protective layer. It is also possible to form, on top of or instead of the protective layer described above, another protective layer. For example, instead of the protective layer described above, a layer of silicon oxide ($SiO_2$) may be formed by applying, on top of a Cr layer, and then burning fine particles of colloidal silica dispersed in tetraalkoxysilane diluted with an alcohol-based solvent.

A magnetic disk has been described above as an example of an information recording medium according to the invention. It is to be understood, however, that a glass substrate according to the invention applies not only to this type of information recording medium but also to magneto-optical disks, optical disks, and the like.

EXAMPLES

Practical Examples 1 to 56 and Comparative Examples 1 to 3

For each of different glass compositions, which each correspond to one of Practical Examples 1 to 56 and Comparative Examples 1 to 3, prescribed amounts of glass ingredients in the form of powder were weighed and put in a platinum crucible, were mixed, and then were melted at 1 550° C. in an electric furnace. When the ingredients were melted sufficiently, stirring blades were put into the molten glass to stir it for about one hour. Thereafter, the stirring blades were taken out, then the molten glass was allowed to stand for 30 minutes, and then it was poured into a mold so as to be formed into a glass block. The glass block was then heated again to close to its glass transition point, and was then cooled slowly so as to be straightened. The glass block thus obtained was then sliced into a disk about 1.5 mm thick and 2.5 inches across, and was cut out using a cutter so as to have concentric inner and outer edges. The two flat surfaces of this disk were subjected to coarse and fine polishing and then to cleaning to obtain a glass substrate of the corresponding Practical or Comparative Example. With each of the glass substrates thus produced, its various properties were evaluated as described below. The results, along with the corresponding compositions and other data, are shown in Tables 1 to 9.

Glass Transition Temperature Tg

The glass transition temperature Tg was measured by heating the glass sample, prepared in the form of powder, at a temperature increase rate of 10° C./min within the temperature range of from room temperature to 900° C. using a differential thermal calorimeter.

Specific Elastic Modulus (E/ρ)

The Young's modulus E was measured in a manner confirming to the method for testing dynamic modulus of elasticity included in the methods for testing elasticity of fine ceramics defined in JIS (Japanese Industrial Standards) R 1602, and then the specific elastic modulus was calculated by dividing the thus measured Young's modulus by the specific gravity ρ measured in distilled water at 25° C. by a method based on Archimedes' principle.

Vickers Hardness Hv

The Vickers hardness Hv was measured using a Vickers hardness tester under the following conditions: with a load of 100 g, and with loading duration of 15 seconds.

Fracture Toughness Kc

The fracture toughness Kc was determined using a Vickers hardness tester and according to the formula noted earlier on the basis of the pressure mark produced with a Vickers indenter under the following conditions: with a load of 500 g, and with loading duration of 15 seconds.

Alkali Elution A

The alkali elution A was determined by first polishing the surface of the glass substrate with cerium oxide so as to obtain a smooth surface having an Ra value of 2 nm or lower, then cleaning its surface, then immersing it in 50 ml of reverse osmosis membrane water at 80° C. for 24 hours, and then analyzing the elution liquid with an ICP emission spectrochemical analyzer.

Si Elution S

The Si elution S was determined by first polishing the surface of the glass substrate with cerium oxide so as to obtain a smooth surface having an Ra value of 2 nm or lower, then cleaning its surface, then immersing it in 50 ml of reverse osmosis membrane water at 80° C. for 24 hours, and then analyzing the elution liquid with an ICP emission spectrochemical analyzer.

As will be clear from Tables 1 to 8, the glass substrates of Examples 1 to 56 had excellent specific elastic moduli without being subjected to strengthening treatment, had predetermined Vickers hardnesses that helped to prevent scratches on their surface and to permit easy surface processing such as polishing, and exhibited low elution of alkali ingredients and of Si. Moreover, they had high fracture toughnesses, and had high heat resistance with Tg values of 550° C. or higher.

By contrast, according to Table 9, with the glass substrate of Comparative Example 1, the $Al_2O_3$ and of R'O contents relative to that of the skeletal ingredients of glass ($SiO_2$+$Al_2O_3$+$B_2O_3$) were both low, and in addition the content ratios of $Al_2O_3$ to $B_2O_3$ and of R'O to MOx were both low. Thus, this glass substrate had a low glass transition temperature, a lower fracture toughness, and high alkali and Si elution. With the glass substrate of Comparative Example 2, the $R_2O$ content was high, the R'O content was zero, and the content ratio of $Al_2O_3$ to $B_2O_3$ was low. Thus, this glass substrate had a low glass transition temperature and high alkali elution. With the glass substrate of Comparative Example 3, the R'O content relative to that of the skeletal ingredients of glass ($SiO_2$+$Al_2O_3$+$B_2O_3$) was low, and the content ratio of R'O to MOx was low. Thus, this glass substrate had a low glass transition temperature, a lower fracture toughness, and high Si elution.

TABLE 1

|  |  | Example |  |  |  |  |  |  |
|---|---|---|---|---|---|---|---|---|
|  |  | 1 | 2 | 3 | 4 | 5 | 6 | 7 |
| Composition (% by Weight) | $SiO_2$ | 60.3 | 60.3 | 59.5 | 62.4 | 61.4 | 60.3 | 59.5 |
|  | $Al_2O_3$ | 13.1 | 14.6 | 14.5 | 13.8 | 13.7 | 14.6 | 14.5 |
|  | $B_2O_3$ | 2.7 | 1.2 | 1.1 | 1.6 | 1.5 | 1.2 | 1.1 |
|  | $Li_2O$ | 3.6 | 4.7 | 3.9 | 5.4 | 4.4 | 4.7 | 3.9 |
|  | $Na_2O$ | 2.5 | 1.7 | 2.9 | 2.3 | 3.9 | 1.7 | 2.9 |
|  | $K_2O$ | 2.1 | 1.7 | 2.3 | 1.7 | 2.5 | 1.7 | 2.3 |
|  | MgO | 8.7 | 8.7 | 8.7 | 5.8 | 5.8 | 5.7 | 5.7 |
|  | ZnO |  |  |  |  |  | 3.0 | 3.0 |
|  | $TiO_2$ | 4.6 | 4.6 | 4.6 | 3.7 | 3.7 | 4.6 | 4.6 |
|  | $ZrO_2$ | 0.9 | 0.9 | 0.9 | 1.2 | 1.2 | 0.9 | 0.9 |
|  | $La_2O_3$ | 1.2 | 1.2 | 1.2 | 1.7 | 1.6 | 1.2 | 1.2 |
|  | $Gd_2O_3$ |  |  |  |  |  |  |  |
|  | $Er_2O_3$ |  |  |  |  |  |  |  |
|  | $CeO_2$ |  |  |  |  |  |  |  |
|  | $Y_2O_3$ |  |  |  |  |  |  |  |
|  | $Nb_2O_5$ |  |  |  |  |  |  |  |
|  | $Ta_2O_5$ |  |  |  |  |  |  |  |
|  | CaO |  |  |  |  |  |  |  |
|  | SrO |  |  |  |  |  |  |  |
|  | BaO |  |  |  |  |  |  |  |
|  | $Sb_2O_3$ | 0.4 | 0.4 | 0.4 | 0.4 | 0.3 | 0.4 | 0.4 |
| $SiO_2 + Al_2O_3 + B_2O_3$ |  | 76.1 | 76.1 | 75.1 | 77.9 | 76.6 | 76.1 | 75.1 |
| $R_2O(Li_2O + Na_2O + K_2O)$ |  | 8.1 | 8.1 | 9.1 | 9.4 | 10.8 | 8.1 | 9.1 |
| R'O(MgO + ZnO) |  | 8.7 | 8.7 | 8.7 | 5.8 | 5.8 | 8.7 | 8.7 |
| $MO_x(TiO_2 + ZrO_2 + Ln_xO_y)$ |  | 6.7 | 6.7 | 6.7 | 6.6 | 6.5 | 6.7 | 6.7 |
| $Al_2O_3/(SiO_2 + Al_2O_3 + B_2O_3)$ |  | 0.17 | 0.19 | 0.19 | 0.18 | 0.18 | 0.19 | 0.19 |
| $Al_2O_3/B_2O_3$ |  | 4.9 | 12.3 | 12.9 | 8.8 | 9.2 | 12.3 | 12.9 |
| $R'O/(SiO_2 + Al_2O_3 + B_2O_3)$ |  | 0.114 | 0.114 | 0.116 | 0.074 | 0.076 | 0.114 | 0.116 |
| $R'O/MO_x$ |  | 1.29 | 1.29 | 1.30 | 0.88 | 0.90 | 1.29 | 1.30 |
| Glass Transition Temp. Tg (°C.) |  | 577 | 586 | 582 | 561 | 554 | 576 | 561 |
| Specific Elastic Modulus (E/ρ) |  | 34.1 | 34.9 | 34.5 | 34.4 | 33.8 | 34.2 | 33.6 |
| Vickers Hardness Hv |  | 604 | 620 | 613 | 607 | 605 | 602 | 609 |
| Fracture Toughness Kc |  | 1.14 | 1.07 | 1.06 | 1.10 | 1.08 | 1.34 | 1.18 |
| Alkali Elution A(ppb) |  | 87 | 60 | 75 | 72 | 70 | 39 | 44 |
| Si Elution S(ppb) |  | 275 | 205 | 289 | 197 | 212 | 107 | 120 |
| Tg/Hv |  | 0.96 | 0.95 | 0.95 | 0.92 | 0.91 | 0.96 | 0.92 |
| Tg × Kc |  | 655 | 626 | 615 | 617 | 596 | 770 | 664 |
| Tg × Kc/Hv |  | 1.08 | 1.01 | 1.00 | 1.02 | 0.99 | 1.28 | 1.09 |

TABLE 2

|  |  | Example |  |  |  |  |  |  |
|---|---|---|---|---|---|---|---|---|
|  |  | 8 | 9 | 10 | 11 | 12 | 13 | 14 |
| Composition (% by Weight) | $SiO_2$ | 60.3 | 59.5 | 60.3 | 60.3 | 59.5 | 60.3 | 59.5 |
|  | $Al_2O_3$ | 14.6 | 14.5 | 14.6 | 14.6 | 14.5 | 14.6 | 14.5 |
|  | $B_2O_3$ | 1.2 | 1.1 | 1.2 | 1.2 | 1.1 | 1.2 | 1.1 |
|  | $Li_2O$ | 4.7 | 3.9 | 4.7 | 4.7 | 3.9 | 4.7 | 3.9 |
|  | $Na_2O$ | 1.7 | 2.9 | 1.7 | 1.7 | 2.9 | 1.7 | 2.9 |
|  | $K_2O$ | 1.7 | 2.3 | 1.7 | 1.7 | 2.3 | 1.7 | 2.3 |
|  | MgO | 3.7 | 3.7 | 8.7 | 5.7 | 5.7 | 5.7 | 5.7 |
|  | ZnO | 5.0 | 5.0 | 3.0 |  |  | 3.0 | 3.0 |
|  | $TiO_2$ | 4.6 | 4.6 | 1.6 | 4.6 | 4.6 | 1.6 | 1.6 |
|  | $ZrO_2$ | 0.9 | 0.9 | 0.9 | 0.9 | 0.9 | 0.9 | 0.9 |
|  | $La_2O_3$ | 1.2 | 1.2 | 1.2 | 1.2 | 1.2 | 1.2 | 1.2 |
|  | $Gd_2O_3$ |  |  |  |  |  |  |  |
|  | $Er_2O_3$ |  |  |  |  |  |  |  |
|  | $CeO_2$ |  |  |  |  |  |  |  |
|  | $Y_2O_3$ |  |  |  |  |  |  |  |
|  | $Nb_2O_5$ |  |  |  | 3.0 | 3.0 | 3.0 | 3.0 |
|  | $Ta_2O_5$ |  |  |  |  |  |  |  |
|  | CaO |  |  |  |  |  |  |  |
|  | SrO |  |  |  |  |  |  |  |
|  | BaO |  |  |  |  |  |  |  |
|  | $Sb_2O_3$ | 0.4 | 0.4 | 0.4 | 0.4 | 0.4 | 0.4 | 0.4 |
| $SiO_2 + Al_2O_3 + B_2O_3$ |  | 76.1 | 75.1 | 76.1 | 76.1 | 75.1 | 76.1 | 75.1 |
| $R_2O(Li_2O + Na_2O + K_2O)$ |  | 8.1 | 9.1 | 8.1 | 8.1 | 9.1 | 8.1 | 9.1 |
| R'O(MgO + ZnO) |  | 8.7 | 8.7 | 11.7 | 5.7 | 5.7 | 8.7 | 8.7 |
| $MO_x(TiO_2 + ZrO_2 + Ln_xO_y)$ |  | 6.7 | 6.7 | 3.7 | 9.7 | 9.7 | 6.7 | 6.7 |
| $Al_2O_3/(SiO_2 + Al_2O_3 + B_2O_3)$ |  | 0.19 | 0.19 | 0.19 | 0.19 | 0.19 | 0.19 | 0.19 |
| $Al_2O_3/B_2O_3$ |  | 12.3 | 12.9 | 12.3 | 12.3 | 12.9 | 12.3 | 12.9 |

TABLE 2-continued

|  | Example |  |  |  |  |  |  |
|---|---|---|---|---|---|---|---|
|  | 8 | 9 | 10 | 11 | 12 | 13 | 14 |
| R'O/(SiO$_2$ + Al$_2$O$_3$ + B$_2$O$_3$) | 0.114 | 0.116 | 0.154 | 0.075 | 0.076 | 0.114 | 0.116 |
| R'O/MO$_x$ | 1.29 | 1.30 | 3.13 | 0.59 | 0.59 | 1.29 | 1.30 |
| Glass Transition Temp. Tg (° C.) | 555 | 566 | 573 | 577 | 571 | 575 | 576 |
| Specific Elastic Modulus (E/ρ) | 33.6 | 33.0 | 34.5 | 34.3 | 33.8 | 33.9 | 33.3 |
| Vickers Hardness Hv | 601 | 605 | 643 | 604 | 605 | 602 | 615 |
| Fracture Toughness Kc | 1.35 | 1.38 | 1.05 | 1.20 | 1.14 | 1.22 | 1.10 |
| Alkali Elution A(ppb) | 37 | 40 | 42 | 34 | 31 | 33 | 33 |
| Si Elution S(ppb) | 115 | 121 | 291 | 100 | 99 | 172 | 196 |
| Tg/Hv | 0.92 | 0.94 | 0.89 | 0.96 | 0.94 | 0.96 | 0.94 |
| Tg × Kc | 750 | 781 | 599 | 691 | 650 | 699 | 636 |
| Tg × Kc/Hv | 1.25 | 1.29 | 0.93 | 1.14 | 1.07 | 1.16 | 1.03 |

TABLE 3

|  |  | Example |  |  |  |  |  |  |
|---|---|---|---|---|---|---|---|---|
|  |  | 15 | 16 | 17 | 18 | 19 | 20 | 21 |
| Composition | SiO$_2$ | 59.4 | 60.3 | 60.3 | 60.3 | 60.3 | 60.3 | 60.3 |
| (% by Weight) | Al$_2$O$_3$ | 13.8 | 14.6 | 14.6 | 14.6 | 14.6 | 14.6 | 16.6 |
|  | B$_2$O$_3$ | 1.6 | 1.2 | 1.2 | 1.2 | 1.2 | 1.2 | 1.2 |
|  | Li$_2$O | 5.4 | 4.7 | 4.7 | 4.7 | 4.7 | 4.7 | 4.7 |
|  | Na$_2$O | 2.3 | 1.7 | 1.7 | 1.7 | 1.7 | 1.7 | 1.7 |
|  | K$_2$O | 1.7 | 1.7 | 1.7 | 1.7 | 1.7 | 1.7 | 1.7 |
|  | MgO | 5.8 | 5.7 | 5.7 | 5.7 | 3.7 | 3.7 | 3.7 |
|  | ZnO | 3.0 | 6.0 | 3.0 | 3.0 | 3.0 | 5.0 | 3.0 |
|  | TiO$_2$ | 0.7 | 1.6 | 1.6 | 1.6 | 1.6 | 1.6 | 1.6 |
|  | ZrO$_2$ | 1.2 | 0.9 | 0.9 | 0.9 | 0.9 | 0.9 | 0.9 |
|  | La$_2$O$_3$ | 1.6 | 1.2 | 1.2 | 1.2 | 1.2 | 1.2 | 1.2 |
|  | Gd$_2$O$_3$ |  |  |  |  |  |  |  |
|  | Er$_2$O$_3$ |  |  |  |  |  |  |  |
|  | CeO$_2$ |  |  |  |  |  |  |  |
|  | Y$_2$O$_3$ |  |  |  |  |  |  |  |
|  | Nb$_2$O$_5$ | 3.0 |  |  |  | 5.0 | 3.0 | 3.0 |
|  | Ta$_2$O$_5$ |  |  |  |  |  |  |  |
|  | CaO |  |  |  | 3.0 |  |  |  |
|  | SrO |  |  |  |  |  |  |  |
|  | BaO |  |  | 3.0 |  |  |  |  |
|  | Sb$_2$O$_3$ | 0.4 | 0.4 | 0.4 | 0.4 | 0.4 | 0.4 | 0.4 |
| SiO$_2$ + Al$_2$O$_3$ + B$_2$O$_3$ |  | 74.9 | 76.1 | 76.1 | 76.1 | 76.1 | 76.1 | 78.1 |
| R$_2$O(Li$_2$O + Na$_2$O + K$_2$O) |  | 9.4 | 8.1 | 8.1 | 8.1 | 8.1 | 8.1 | 8.1 |
| R'O(MgO + ZnO) |  | 8.8 | 11.7 | 8.7 | 8.7 | 6.7 | 8.7 | 6.7 |
| MO$_x$(TiO$_2$ + ZrO$_2$ + Ln$_x$O$_y$) |  | 6.6 | 3.7 | 3.7 | 3.7 | 8.7 | 6.7 | 6.7 |
| Al$_2$O$_3$/(SiO$_2$ + Al$_2$O$_3$ + B$_2$O$_3$) |  | 0.19 | 0.19 | 0.19 | 0.19 | 0.19 | 0.19 | 0.21 |
| Al$_2$O$_3$/B$_2$O$_3$ |  | 8.8 | 12.3 | 12.3 | 12.3 | 12.3 | 12.3 | 14.0 |
| R'O/(SiO$_2$ + Al$_2$O$_3$ + B$_2$O$_3$) |  | 0.118 | 0.154 | 0.114 | 0.114 | 0.088 | 0.114 | 0.086 |
| R'O/MO$_x$ |  | 1.34 | 3.13 | 2.33 | 2.33 | 0.77 | 1.29 | 0.99 |
| Glass Transition Temp. Tg (° C.) |  | 550 | 565 | 559 | 569 | 556 | 556 | 582 |
| Specific Elastic Modulus (E/ρ) |  | 33.9 | 33.9 | 33.2 | 34.4 | 33.2 | 33.0 | 33.5 |
| Vickers Hardness Hv |  | 615 | 613 | 614 | 622 | 601 | 607 | 606 |
| Fracture Toughness Kc |  | 1.02 | 1.13 | 1.18 | 1.17 | 1.18 | 1.17 | 1.25 |
| Alkali Elution A(ppb) |  | 57 | 40 | 45 | 42 | 40 | 41 | 33 |
| Si Elution S(ppb) |  | 316 | 227 | 222 | 341 | 121 | 192 | 124 |
| Tg/Hv |  | 0.89 | 0.92 | 0.91 | 0.91 | 0.93 | 0.91 | 0.96 |
| Tg × Kc |  | 561 | 639 | 661 | 664 | 657 | 648 | 726 |
| Tg × Kc/Hv |  | 0.91 | 1.04 | 1.08 | 1.07 | 1.09 | 1.07 | 1.20 |

TABLE 4

|  |  | Example |  |  |  |  |  |  |
|---|---|---|---|---|---|---|---|---|
|  |  | 22 | 23 | 24 | 25 | 26 | 27 | 28 |
| Composition | SiO$_2$ | 61.6 | 59.0 | 58.1 | 61.6 | 59.0 | 58.1 | 58.3 |
| (% by Weight) | Al$_2$O$_3$ | 14.2 | 15.1 | 15.4 | 14.2 | 15.1 | 15.4 | 15.0 |
|  | B$_2$O$_3$ | 1.4 | 0.9 | 0.8 | 1.4 | 0.9 | 0.8 | 0.9 |
|  | Li$_2$O | 5.1 | 4.3 | 4.0 | 5.1 | 4.3 | 4.0 | 3.7 |
|  | Na$_2$O | 2.1 | 1.4 | 1.2 | 2.1 | 1.4 | 1.2 | 2.3 |
|  | K$_2$O | 1.7 | 1.7 | 1.7 | 1.7 | 1.7 | 1.7 | 2.1 |
|  | MgO | 7.0 | 10.4 | 11.6 | 4.0 | 7.4 | 8.6 | 7.4 |

TABLE 4-continued

| | | Example | | | | | | |
|---|---|---|---|---|---|---|---|---|
| | | 22 | 23 | 24 | 25 | 26 | 27 | 28 |
| | ZnO | | | | 3.0 | 3.0 | 3.0 | 3.0 |
| | TiO$_2$ | 4.0 | 5.1 | 5.5 | 1.0 | 2.1 | 2.5 | 2.1 |
| | ZrO$_2$ | 1.1 | 0.7 | 0.6 | 1.1 | 0.7 | 0.6 | 0.7 |
| | La$_2$O$_3$ | 1.5 | 1.0 | 0.8 | 1.5 | | | |
| | Gd$_2$O$_3$ | | | | | 1.0 | | |
| | Er$_2$O$_3$ | | | | | | 0.8 | |
| | CeO$_2$ | | | | | | | 1.0 |
| | Y$_2$O$_3$ | | | | | | | |
| | Nb$_2$O$_5$ | | | | 3.0 | 3.0 | 3.0 | 3.0 |
| | Ta$_2$O$_5$ | | | | | | | |
| | CaO | | | | | | | |
| | SrO | | | | | | | |
| | BaO | | | | | | | |
| | Sb$_2$O$_3$ | 0.4 | 0.4 | 0.4 | 0.4 | 0.4 | 0.4 | 0.4 |
| SiO$_2$ + Al$_2$O$_3$ + B$_2$O$_3$ | | 77.1 | 75.0 | 74.3 | 77.1 | 75.0 | 74.3 | 74.2 |
| R$_2$O(Li$_2$O + Na$_2$O + K$_2$O) | | 8.9 | 7.3 | 6.8 | 8.9 | 7.3 | 6.8 | 8.2 |
| R'O(MgO + ZnO) | | 7.0 | 10.4 | 11.6 | 7.0 | 10.4 | 11.6 | 10.4 |
| MO$_x$(TiO$_2$ + ZrO$_2$ + Ln$_x$O$_y$) | | 6.6 | 6.8 | 6.9 | 6.6 | 6.8 | 6.9 | 6.8 |
| Al$_2$O$_3$/(SiO$_2$ + Al$_2$O$_3$ + B$_2$O$_3$) | | 0.18 | 0.20 | 0.21 | 0.18 | 0.20 | 0.21 | 0.20 |
| Al$_2$O$_3$/B$_2$O$_3$ | | 10.0 | 15.9 | 19.5 | 10.0 | 15.9 | 19.5 | 16.7 |
| R'O/(SiO$_2$ + Al$_2$O$_3$ + B$_2$O$_3$) | | 0.090 | 0.139 | 0.156 | 0.090 | 0.139 | 0.156 | 0.141 |
| R'O/MO$_x$ | | 1.05 | 1.53 | 1.68 | 1.05 | 1.53 | 1.68 | 1.54 |
| Glass Transition Temp. Tg (° C.) | | 567 | 598 | 618 | 559 | 595 | 609 | 598 |
| Specific Elastic Modulus (E/ρ) | | 34.5 | 35.4 | 35.8 | 33.4 | 34.3 | 34.7 | 34.0 |
| Vickers Hardness Hv | | 636 | 657 | 658 | 606 | 619 | 632 | 623 |
| Fracture Toughness Kc | | 1.12 | 1.17 | 1.20 | 1.24 | 1.19 | 1.16 | 1.10 |
| Alkali Elution A(ppb) | | 38 | 38 | 48 | 49 | 34 | 35 | 44 |
| Si Elution S(ppb) | | 154 | 264 | 311 | 171 | 158 | 212 | 199 |
| Tg/Hv | | 0.89 | 0.91 | 0.94 | 0.92 | 0.96 | 0.96 | 0.96 |
| Tg × Kc | | 634 | 702 | 741 | 691 | 705 | 706 | 659 |
| Tg × Kc/Hv | | 1.00 | 1.07 | 1.13 | 1.14 | 1.14 | 1.12 | 1.06 |

TABLE 5

| | | Example | | | | | | |
|---|---|---|---|---|---|---|---|---|
| | | 29 | 30 | 31 | 32 | 33 | 34 | 35 |
| Composition (% by Weight) | SiO$_2$ | 57.6 | 61.8 | 60.3 | 60.3 | 61.8 | 60.3 | 60.3 |
| | Al$_2$O$_3$ | 15.4 | 14.9 | 15.6 | 15.6 | 14.9 | 15.6 | 15.6 |
| | B$_2$O$_3$ | 0.7 | 1.2 | 1.2 | 1.2 | 1.2 | 1.2 | 1.2 |
| | Li$_2$O | 3.5 | 4.8 | 4.7 | 4.7 | 4.8 | 4.6 | 4.7 |
| | Na$_2$O | 2.0 | 1.8 | 1.7 | 1.7 | 1.8 | 1.7 | 1.7 |
| | K$_2$O | 2.1 | 1.7 | 1.7 | 1.7 | 1.7 | 1.7 | 1.7 |
| | MgO | 8.6 | 8.7 | 8.7 | 8.7 | 5.7 | 5.7 | 5.7 |
| | ZnO | 3.0 | | | 1.2 | 3.0 | 3.0 | 4.2 |
| | TiO$_2$ | 2.5 | 4.6 | 4.6 | 4.6 | 1.6 | 1.6 | 1.6 |
| | ZrO$_2$ | 0.6 | | | | | | |
| | La$_2$O$_3$ | | | | | | | |
| | Gd$_2$O$_3$ | | | | | | | |
| | Er$_2$O$_3$ | | | | | | | |
| | CeO$_2$ | | | | | | | |
| | Y$_2$O$_3$ | 0.8 | | | | | | |
| | Nb$_2$O$_5$ | 3.0 | | 1.2 | | 3.0 | 4.2 | 3.0 |
| | Ta$_2$O$_5$ | | | | | | | |
| | CaO | | | | | | | |
| | SrO | | | | | | | |
| | BaO | | | | | | | |
| | Sb$_2$O$_3$ | 0.4 | 0.4 | 0.4 | 0.4 | 0.4 | 0.4 | 0.4 |
| SiO$_2$ + Al$_2$O$_3$ + B$_2$O$_3$ | | 73.7 | 77.9 | 77.0 | 77.0 | 77.9 | 77.0 | 77.0 |
| R$_2$O(Li$_2$O + Na$_2$O + K$_2$O) | | 7.5 | 8.4 | 8.1 | 8.1 | 8.4 | 8.1 | 8.1 |
| R'O(MgO + ZnO) | | 11.6 | 8.7 | 8.7 | 9.9 | 8.7 | 8.7 | 9.9 |
| MO$_x$(TiO$_2$ + ZrO$_2$ + Ln$_x$O$_y$) | | 6.9 | 4.6 | 5.8 | 4.6 | 4.6 | 5.8 | 4.6 |
| Al$_2$O$_3$/(SiO$_2$ + Al$_2$O$_3$ + B$_2$O$_3$) | | 0.21 | 0.19 | 0.20 | 0.20 | 0.19 | 0.20 | 0.20 |
| Al$_2$O$_3$/B$_2$O$_3$ | | 20.5 | 12.0 | 13.1 | 13.1 | 12.0 | 13.1 | 13.1 |
| R'O/(SiO$_2$ + Al$_2$O$_3$ + B$_2$O$_3$) | | 0.157 | 0.112 | 0.113 | 0.129 | 0.112 | 0.113 | 0.129 |
| R'O/MO$_x$ | | 1.69 | 1.88 | 1.50 | 2.17 | 1.88 | 1.50 | 2.17 |
| Glass Transition Temp. Tg (° C.) | | 608 | 580 | 589 | 577 | 568 | 569 | 560 |
| Specific Elastic Modulus (E/ρ) | | 34.3 | 35.1 | 35.0 | 35.1 | 34.0 | 34.0 | 34.0 |
| Vickers Hardness Hv | | 640 | 635 | 637 | 618 | 615 | 613 | 622 |
| Fracture Toughness Kc | | 1.05 | 1.10 | 1.14 | 1.23 | 1.14 | 1.21 | 1.10 |
| Alkali Elution A(ppb) | | 48 | 43 | 41 | 35 | 38 | 36 | 39 |

TABLE 5-continued

|  | Example | | | | | | |
|---|---|---|---|---|---|---|---|
|  | 29 | 30 | 31 | 32 | 33 | 34 | 35 |
| Si Elution S(ppb) | 265 | 86 | 93 | 117 | 94 | 117 | 115 |
| Tg/Hv | 0.95 | 0.91 | 0.92 | 0.93 | 0.92 | 0.93 | 0.90 |
| Tg × Kc | 636 | 639 | 672 | 706 | 646 | 687 | 617 |
| Tg × Kc/Hv | 0.99 | 1.01 | 1.05 | 1.14 | 1.05 | 1.12 | 0.99 |

TABLE 6

|  |  | Example | | | | | | |
|---|---|---|---|---|---|---|---|---|
|  |  | 36 | 37 | 38 | 39 | 40 | 41 | 42 |
| Composition (% by Weight) | $SiO_2$ | 60.9 | 59.5 | 59.0 | 59.5 | 58.3 | 60.2 | 59.0 |
|  | $Al_2O_3$ | 14.8 | 15.4 | 15.1 | 14.5 | 15.0 | 15.3 | 15.9 |
|  | $B_2O_3$ | 1.2 | 1.1 | 0.9 | 1.1 | 0.9 | 1.0 | 0.9 |
|  | $Li_2O$ | 4.1 | 3.9 | 4.3 | 3.9 | 3.7 | 4.4 | 4.3 |
|  | $Na_2O$ | 3.1 | 2.9 | 1.4 | 2.9 | 2.3 | 1.5 | 1.4 |
|  | $K_2O$ | 2.3 | 2.3 | 1.7 | 2.3 | 2.1 | 1.7 | 1.7 |
|  | MgO | 5.7 | 5.7 | 7.4 | 5.7 | 7.4 | 7.4 | 7.4 |
|  | ZnO | 3.0 | 3.0 | 3.0 | 3.0 | 3.0 | 3.0 | 3.0 |
|  | $TiO_2$ | 1.6 | 1.6 | 2.1 | 1.6 | 2.1 | 2.1 | 2.1 |
|  | $ZrO_2$ |  |  | 0.7 | 0.9 | 0.7 |  |  |
|  | $La_2O_3$ |  |  | 1.0 | 1.2 | 1.0 |  |  |
|  | $Gd_2O_3$ |  |  |  |  |  |  |  |
|  | $Er_2O_3$ |  |  |  |  |  |  |  |
|  | $CeO_2$ |  |  |  |  |  |  |  |
|  | $Y_2O_3$ |  |  |  |  |  |  |  |
|  | $Nb_2O_5$ | 3.0 | 4.2 |  |  |  | 3.0 | 4.0 |
|  | $Ta_2O_5$ |  |  |  |  |  |  |  |
|  | CaO |  |  | 3.0 | 3.0 | 3.0 |  |  |
|  | SrO |  |  |  |  |  |  |  |
|  | BaO |  |  |  |  |  |  |  |
|  | $Sb_2O_3$ | 0.4 | 0.4 | 0.4 | 0.4 | 0.4 | 0.4 | 0.4 |
| $SiO_2 + Al_2O_3 + B_2O_3$ | | 76.9 | 76.0 | 75.0 | 75.1 | 74.2 | 76.5 | 75.8 |
| $R_2O(Li_2O + Na_2O + K_2O)$ | | 9.5 | 9.1 | 7.3 | 9.1 | 8.2 | 7.5 | 7.3 |
| R'O(MgO + ZnO) | | 8.7 | 8.7 | 10.4 | 8.7 | 10.4 | 10.4 | 10.4 |
| $MO_x(TiO_2 + ZrO_2 + Ln_xO_y)$ | | 4.6 | 5.8 | 3.8 | 3.7 | 3.8 | 5.1 | 6.1 |
| $Al_2O_3/(SiO_2 + Al_2O_3 + B_2O_3)$ | | 0.19 | 0.20 | 0.20 | 0.19 | 0.20 | 0.20 | 0.21 |
| $Al_2O_3/B_2O_3$ | | 12.6 | 13.8 | 15.9 | 12.9 | 16.7 | 15.5 | 16.7 |
| $R'O/(SiO_2 + Al_2O_3 + B_2O_3)$ | | 0.113 | 0.114 | 0.139 | 0.116 | 0.141 | 0.137 | 0.138 |
| $R'O/MO_x$ | | 1.89 | 1.51 | 2.72 | 2.37 | 2.76 | 2.03 | 1.71 |
| Glass Transition Temp. Tg (° C.) | | 562 | 569 | 577 | 562 | 584 | 583 | 591 |
| Specific Elastic Modulus (E/ρ) | | 33.4 | 33.7 | 34.8 | 34.1 | 34.4 | 34.5 | 34.3 |
| Vickers Hardness Hv | | 615 | 602 | 644 | 639 | 651 | 619 | 597 |
| Fracture Toughness Kc | | 1.41 | 1.06 | 1.01 | 0.96 | 0.92 | 1.02 | 1.09 |
| Alkali Elution A(ppb) | | 43 | 58 | 37 | 58 | 46 | 43 | 38 |
| Si Elution S(ppb) | | 97 | 122 | 296 | 392 | 453 | 144 | 124 |
| Tg/Hv | | 0.91 | 0.95 | 0.90 | 0.88 | 0.90 | 0.94 | 0.99 |
| Tg × Kc | | 793 | 601 | 581 | 541 | 539 | 597 | 645 |
| Tg × Kc/Hv | | 1.29 | 1.00 | 0.90 | 0.85 | 0.83 | 0.96 | 1.08 |

TABLE 7

|  |  | Example | | | | | | |
|---|---|---|---|---|---|---|---|---|
|  |  | 43 | 44 | 45 | 46 | 47 | 48 | 49 |
| Composition (% by Weight) | $SiO_2$ | 59.5 | 58.3 | 60.2 | 59.0 | 59.5 | 58.3 | 60.2 |
|  | $Al_2O_3$ | 15.2 | 15.8 | 17.3 | 17.9 | 17.2 | 17.7 | 15.3 |
|  | $B_2O_3$ | 0.9 | 0.9 | 1.0 | 0.9 | 0.9 | 0.9 | 1.0 |
|  | $Li_2O$ | 3.8 | 3.7 | 4.4 | 4.3 | 3.8 | 3.7 | 4.4 |
|  | $Na_2O$ | 2.4 | 2.3 | 1.6 | 1.4 | 2.4 | 2.3 | 1.5 |
|  | $K_2O$ | 2.2 | 2.1 | 1.7 | 1.7 | 2.2 | 2.1 | 1.7 |
|  | MgO | 7.4 | 7.4 | 5.4 | 5.4 | 5.4 | 5.4 | 5.4 |
|  | ZnO | 3.0 | 3.0 | 3.0 | 3.0 | 3.0 | 3.0 | 3.0 |
|  | $TiO_2$ | 2.1 | 2.1 | 2.1 | 2.1 | 2.1 | 2.1 | 2.1 |
|  | $ZrO_2$ |  |  |  |  |  |  |  |
|  | $La_2O_3$ |  |  |  |  |  |  |  |
|  | $Gd_2O_3$ |  |  |  |  |  |  |  |
|  | $Er_2O_3$ |  |  |  |  |  |  |  |
|  | $CeO_2$ |  |  |  |  |  |  |  |

TABLE 7-continued

|  |  | Example |  |  |  |  |  |  |
|---|---|---|---|---|---|---|---|---|
|  |  | 43 | 44 | 45 | 46 | 47 | 48 | 49 |
|  | $Y_2O_3$ |  |  |  |  |  |  | 1.0 |
|  | $Nb_2O_5$ | 3.0 | 4.0 | 3.0 | 4.0 | 3.0 | 4.0 | 4.0 |
|  | $Ta_2O_5$ |  |  |  |  |  |  |  |
|  | CaO |  |  |  |  |  |  |  |
|  | SrO |  |  |  |  |  |  |  |
|  | BaO |  |  |  |  |  |  |  |
|  | $Sb_2O_3$ | 0.4 | 0.4 | 0.4 | 0.4 | 0.4 | 0.4 | 0.4 |
| $SiO_2 + Al_2O_3 + B_2O_3$ |  | 75.6 | 75.0 | 78.5 | 77.8 | 77.6 | 77.0 | 76.5 |
| $R_2O(Li_2O + Na_2O + K_2O)$ |  | 8.4 | 8.2 | 7.5 | 7.3 | 8.4 | 8.2 | 7.5 |
| R'O(MgO + ZnO) |  | 10.4 | 10.4 | 8.4 | 8.4 | 8.4 | 8.4 | 8.4 |
| $MO_x(TiO_2 + ZrO_2 + Ln_xO_y)$ |  | 5.1 | 6.1 | 5.1 | 6.1 | 5.1 | 6.1 | 7.1 |
| $Al_2O_3/(SiO_2 + Al_2O_3 + B_2O_3)$ |  | 0.20 | 0.21 | 0.22 | 0.23 | 0.22 | 0.23 | 0.20 |
| $Al_2O_3/B_2O_3$ |  | 16.3 | 17.5 | 17.5 | 18.8 | 18.4 | 19.8 | 15.5 |
| $R'O/(SiO_2 + Al_2O_3 + B_2O_3)$ |  | 0.138 | 0.139 | 0.108 | 0.109 | 0.109 | 0.110 | 0.110 |
| $R'O/MO_x$ |  | 2.04 | 1.73 | 1.64 | 1.39 | 1.65 | 1.39 | 1.18 |
| Glass Transition Temp. Tg (° C.) |  | 585 | 598 | 590 | 591 | 592 | 598 | 585 |
| Specific Elastic Modulus (E/ρ) |  | 34.0 | 34.0 | 33.9 | 33.9 | 33.5 | 33.6 | 33.7 |
| Vickers Hardness Hv |  | 618 | 621 | 610 | 607 | 602 | 603 | 594 |
| Fracture Toughness Kc |  | 1.05 | 1.13 | 1.19 | 1.21 | 1.11 | 1.14 | 1.08 |
| Alkali Elution A(ppb) |  | 44 | 41 | 26 | 36 | 37 | 50 | 57 |
| Si Elution S(ppb) |  | 157 | 166 | 101 | 148 | 152 | 200 | 164 |
| Tg/Hv |  | 0.95 | 0.96 | 0.97 | 0.97 | 0.98 | 0.99 | 0.99 |
| Tg × Kc |  | 613 | 677 | 701 | 713 | 654 | 682 | 634 |
| Tg × Kc/Hv |  | 0.99 | 1.09 | 1.15 | 1.18 | 1.09 | 1.13 | 1.07 |

TABLE 8

|  |  | Example |  |  |  |  |  |  |
|---|---|---|---|---|---|---|---|---|
|  |  | 50 | 51 | 52 | 53 | 54 | 55 | 56 |
| Composition | $SiO_2$ | 59.5 | 60.2 | 59.5 | 60.2 | 59.5 | 60.2 | 60.2 |
| (% by Weight) | $Al_2O_3$ | 15.2 | 15.3 | 15.2 | 15.3 | 15.2 | 15.3 | 18.3 |
|  | $B_2O_3$ | 0.9 | 1.0 | 0.9 | 1.0 | 0.9 | 1.0 | 1.0 |
|  | $Li_2O$ | 3.8 | 4.4 | 3.8 | 4.4 | 3.8 | 4.4 | 4.4 |
|  | $Na_2O$ | 2.4 | 1.5 | 2.4 | 1.5 | 2.4 | 1.5 | 1.5 |
|  | $K_2O$ | 2.2 | 1.7 | 2.2 | 1.7 | 2.2 | 1.7 | 1.7 |
|  | MgO | 5.4 | 5.4 | 5.4 | 5.4 | 5.4 | 3.4 | 3.4 |
|  | ZnO | 3.0 | 3.0 | 3.0 | 3.0 | 3.0 | 3.0 | 3.0 |
|  | $TiO_2$ | 2.1 | 2.1 | 2.1 | 2.1 | 2.1 | 2.1 | 2.1 |
|  | $ZrO_2$ |  |  |  |  |  |  |  |
|  | $La_2O_3$ |  |  |  |  |  |  |  |
|  | $Gd_2O_3$ |  |  |  |  |  |  |  |
|  | $Er_2O_3$ |  |  |  |  |  |  |  |
|  | $CeO_2$ |  |  |  |  |  |  |  |
|  | $Y_2O_3$ | 1.0 |  |  |  |  |  |  |
|  | $Nb_2O_5$ | 4.0 | 3.0 | 3.0 | 3.0 |  | 4.0 | 4.0 |
|  | $Ta_2O_5$ |  |  |  |  | 3.0 | 3.0 |  |
|  | CaO |  | 2.0 | 2.0 |  |  |  |  |
|  | SrO |  |  |  | 2.0 |  |  |  |
|  | BaO |  |  |  |  | 2.0 |  |  |
|  | $Sb_2O_3$ | 0.4 | 0.4 | 0.4 | 0.4 | 0.4 | 0.4 | 0.4 |
| $SiO_2 + Al_2O_3 + B_2O_3$ |  | 75.6 | 76.5 | 75.6 | 76.5 | 75.6 | 76.5 | 79.5 |
| $R_2O(Li_2O + Na_2O + K_2O)$ |  | 8.4 | 7.5 | 8.4 | 7.5 | 8.4 | 7.5 | 7.5 |
| R'O(MgO + ZnO) |  | 8.4 | 8.4 | 8.4 | 8.4 | 8.4 | 6.4 | 6.4 |
| $MO_x(TiO_2 + ZrO_2 + Ln_xO_y)$ |  | 7.1 | 5.1 | 5.1 | 5.1 | 5.1 | 9.1 | 6.1 |
| $Al_2O_3/(SiO_2 + Al_2O_3 + B_2O_3)$ |  | 0.20 | 0.20 | 0.20 | 0.20 | 0.20 | 0.20 | 0.23 |
| $Al_2O_3/B_2O_3$ |  | 16.3 | 15.5 | 16.3 | 15.5 | 16.3 | 15.5 | 18.5 |
| $R'O/(SiO_2 + Al_2O_3 + B_2O_3)$ |  | 0.112 | 0.110 | 0.112 | 0.110 | 0.112 | 0.084 | 0.081 |
| $R'O/MO_x$ |  | 1.18 | 1.64 | 1.65 | 1.64 | 1.65 | 0.70 | 1.05 |
| Glass Transition Temp. Tg (° C.) |  | 580 | 577 | 579 | 572 | 585 | 582 | 592 |
| Specific Elastic Modulus (E/ρ) |  | 33.2 | 34.1 | 33.7 | 33.4 | 33.1 | 33.1 | 33.5 |
| Vickers Hardness Hv |  | 595 | 606 | 606 | 607 | 603 | 585 | 584 |
| Fracture Toughness Kc |  | 1.13 | 0.96 | 0.87 | 1.03 | 1.03 | 1.15 | 1.25 |
| Alkali Elution A(ppb) |  | 39 | 34 | 40 | 30 | 36 | 42 | 40 |
| Si Elution S(ppb) |  | 99 | 160 | 191 | 106 | 122 | 58 | 77 |
| Tg/Hv |  | 0.98 | 0.95 | 0.96 | 0.94 | 0.97 | 0.99 | 1.01 |
| Tg × Kc |  | 655 | 551 | 501 | 589 | 602 | 668 | 741 |
| Tg × Kc/Hv |  | 1.10 | 0.91 | 0.83 | 0.97 | 1.00 | 1.14 | 1.27 |

TABLE 9

| | | Comparative Example | | |
|---|---|---|---|---|
| | | 1 | 2 | 3 |
| Composition (% by Weight) | SiO$_2$ | 56.1 | 63.5 | 57.1 |
| | Al$_2$O$_3$ | 5.6 | 7.9 | 11.6 |
| | B$_2$O$_3$ | 3.9 | 5.2 | 3.9 |
| | Li$_2$O | 4.1 | 6.0 | 4.1 |
| | Na$_2$O | 4.5 | 7.0 | 4.5 |
| | K$_2$O | 2.3 | 4.0 | 2.3 |
| | MgO | 4.3 | | 2.3 |
| | ZnO | | | |
| | TiO$_2$ | 3.5 | 1.9 | 3.5 |
| | ZrO$_2$ | 4.4 | 1.8 | 4.4 |
| | La$_2$O$_3$ | 4.9 | 2.4 | 4.9 |
| | Gd$_2$O$_3$ | | | |
| | Er$_2$O$_3$ | | | |
| | CeO$_2$ | | | |
| | Y$_2$O$_3$ | | | |
| | Nb$_2$O$_5$ | | | |
| | Ta$_2$O$_5$ | | | |
| | CaO | 6.3 | | 1.3 |
| | SrO | | | |
| | BaO | | | |
| | Sb$_2$O$_3$ | 0.3 | 0.3 | 0.3 |
| SiO$_2$ + Al$_2$O$_3$ + B$_2$O$_3$ | | 65.7 | 76.6 | 72.6 |
| R$_2$O(Li$_2$O + Na$_2$O + K$_2$O) | | 10.8 | 17.0 | 10.9 |
| R'O(MgO + ZnO) | | 4.3 | 0.0 | 2.3 |
| MO$_x$(TiO$_2$ + ZrO$_2$ + Ln$_x$O$_y$) | | 12.7 | 6.1 | 12.8 |
| Al$_2$O$_3$/(SiO$_2$ + Al$_2$O$_3$ + B$_2$O$_3$) | | 0.09 | 0.10 | 0.16 |
| Al$_2$O$_3$/B$_2$O$_3$ | | 1.4 | 1.5 | 3.0 |
| R'O/(SiO$_2$ + Al$_2$O$_3$ + B$_2$O$_3$) | | 0.065 | 0.000 | 0.032 |
| R'O/MO$_x$ | | 0.34 | 0.00 | 0.18 |
| Glass Transition Temp. Tg (° C.) | | 532 | 494 | 534 |
| Specific Elastic Modulus (E/ρ) | | 33.8 | 33.3 | 33.1 |
| Vickers Hardness Hv | | 657 | 575 | 645 |
| Fracture Toughness Kc | | 0.73 | 0.98 | 0.82 |
| Alkali Elution A(ppb) | | 236 | 316 | 198 |
| Si Elution S(ppb) | | 1013 | 454 | 796 |
| Tg/Hv | | 0.81 | 0.86 | 0.83 |
| Tg × Kc | | 391 | 484 | 437 |
| Tg × Kc/Hv | | 0.59 | 0.84 | 0.68 |

What is claimed is:

1. A glass composition comprising the following glass ingredients:
   60.2 to 70% by weight of SiO$_2$;
   1 to 20% by weight of Al$_2$O$_3$;
   B$_2$O$_3$, wherein the B$_2$O$_3$ is present in an amount up to 10%;
   SiO$_2$+Al$_2$O$_3$+B$_2$O$_3$ accounting for 61.2 to 90% by weight;
   a total of 3.0 to 15% by weight of R$_2$O compounds, where R=Li, Na, and K, wherein the following condition is fulfilled: 0.1% ≦Na$_2$O<6%;
   a total of 2.0 to 15% by weight of R'O compounds, where R'=Mg, and Zn; and
   a total of 1.0 to 20% by weight of MOx (TiO$_2$+ZrO$_2$+Ln$_x$O$_y$), where Ln$_x$O$_y$ represents at least one compound selected from the group consisting of lanthanoid metal oxides, Y$_2$O$_3$, Nb$_2$O$_5$, and Ta$_2$O$_5$,
   wherein the glass composition does not include CaO and the following condition is fulfilled:

0.070<(total content of R'O compounds)/(SiO$_2$+ Al$_2$O$_3$+B$_2$O$_3$)<0.200.

2. A glass composition as claimed in claim 1, wherein the following condition is further fulfilled:

0.10<Al$_2$O$_3$/(SiO$_2$+Al$_2$O$_3$+B$_2$O$_3$)<0.35.

3. A glass composition as claimed in claim 1, wherein the following condition is further fulfilled:

Al$_2$O$_3$/B$_2$O$_3$>2.0.

4. A glass composition as claimed in claim 1, wherein the following condition is further fulfilled:

0.50<(total content of R'O compounds)/MOx<5.00.

5. A glass substrate for an information recording medium, the glass substrate comprising the following glass ingredients:
   60.2 to 70% by weight of SiO$_2$;
   1 to 20% by weight of Al$_2$O$_3$;
   B$_2$O$_3$, wherein the B$_2$O$_3$ is present in an amount up to 10%;
   SiO$_2$+Al$_2$O$_3$+B$_2$O$_3$ accounting for 61.2 to 90% by weight;
   a total of 3.0 to 15% by weight of R$_2$O compounds, where R=Li, Na, and K, wherein the following condition is fulfilled: 0.1%≦Na$_2$O<6%
   a total of 2.0 to 15% by weight of R'O compounds, where R'=Mg, and Zn; and
   a total of 1.0 to 20% by weight of MOx (TiO$_2$+ZrO$_2$+ Ln$_x$O$_y$), where Ln$_x$O$_y$ represents at least one compound selected from the group consisting of lanthanoid metal oxides, Y$_2$O$_3$, Nb$_2$O$_5$, and Ta$_2$O$_5$,
   wherein the glass substrate does not include CaO and the following condition is fulfilled:

0.070<(total content of R'O compounds)/(SiO$_2$+ Al$_2$O$_3$+B$_2$O$_3$)<0.200.

6. A glass substrate as claimed in claim 5, wherein the glass substrate has:
   a specific elastic modulus E/ρ of 33 or higher;
   a Vickers hardness Hv in a range of from 550 to 675;
   alkali elution A of 200 ppb or lower per 2.5-inch disk;
   Si elution S of 500 ppb or lower per 2.5-inch disk;
   a fracture toughness Kc of 0.85 MPa/m$^{1/2}$ or greater; and
   a glass transition temperature Tg of 550° C. or lower.

7. A glass substrate as claimed in claim 6, wherein the following conditions are fulfilled:

$Tg/Hv>0.85$;

$Tg\times Kc>500$, $Tg\times Kc/Hv>0.80$.

8. An information recording medium having an information recording layer formed on a glass substrate as claimed in claim 5.

9. A glass composition as claimed in claim 1, wherein the glass composition comprises 0.5% to 10% by weight of B$_2$O$_3$.

10. A glass substrate as claimed in claim 5, wherein the glass substrate comprises 0.5% to 10% by weight of B$_2$O$_3$.

11. A glass composition as claimed in claim 1, wherein the glass composition comprises 0.1% to 3.9% by weight of Na$_2$O.

12. A glass substrate as claimed in claim 5, wherein the glass substrate comprises 0.1% to 3.9% by weight of Na$_2$O.

13. A glass composition as claimed in claim 1, wherein the following conditions are further fulfilled:

0.080<(total content of R'O compounds)/(SiO$_2$+ Al$_2$O$_3$+B$_2$O$_3$)<0.180;

0.15<Al$_2$O$_3$/(SiO$_2$+Al$_2$O$_3$30 B$_2$O$_3$)<0.25.

14. A glass substrate as claimed in claim 5, wherein the following conditions are further fulfilled:

0.080<(total content of R'O compounds)/(SiO$_2$+ Al$_2$O$_3$+B$_2$O$_3$)<0.180;

0.15<Al$_2$O$_3$/(SiO$_2$+Al$_2$O$_3$+B$_2$O$_3$)<0.25.

* * * * *

UNITED STATES PATENT AND TRADEMARK OFFICE
CERTIFICATE OF CORRECTION

PATENT NO. : 7,687,419 B2 Page 1 of 1
APPLICATION NO. : 10/957899
DATED : March 30, 2010
INVENTOR(S) : Hideki Kawai It is certified that error appears in the above-identified patent and that said Letters Patent is hereby corrected as shown below:

Title Page:
(54), delete "SUSBSTRATE" and insert -- SUBSTRATE --.

Column 22:
Line 13, delete "< 6 %" and insert -- < 6 %; --.

Column 22:
Line 58, delete "30 $B_2O_3$) < 0.25." and insert -- + $B_2O_3$) < 0.25. --.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,687,419 B2  Page 1 of 1
APPLICATION NO. : 10/957899
DATED : March 30, 2010
INVENTOR(S) : Hideki Kawai It is certified that error appears in the above-identified patent and that said Letters Patent is hereby corrected as shown below:

Title Page, Item (54) and at Column 1, line 1, in the title:
Delete "SUSBSTRATE" and insert -- SUBSTRATE --.

Column 22:
Line 13, delete "< 6 %" and insert -- < 6 %; --.

Column 22:
Line 58, delete "30 $B_2O_3$) < 0.25." and insert -- + $B_2O_3$) < 0.25. --.

This certificate supersedes the Certificate of Correction issued May 25, 2010.

Signed and Sealed this

Twenty-second Day of June, 2010

David J. Kappos
*Director of the United States Patent and Trademark Office*